US010796263B2

(12) United States Patent
Ghosh et al.

(10) Patent No.: US 10,796,263 B2
(45) Date of Patent: Oct. 6, 2020

(54) SYSTEM AND METHOD FOR ASSESSING CLIENT PROCESS HEALTH

(71) Applicant: Genpact Luxembourg S.a.r.l., Luxembourg (LU)

(72) Inventors: Shantanu Ghosh, Gurgaon (IN); Vivek Saxena, Gurgaon (IN); Rajesh Sanghavi, Gurgaon (IN); Lavi Sharma, Noida (IN)

(73) Assignee: GENPACT LUXEMBOURG S.A.R.L., Luxembourg (LU)

( * ) Notice: Subject to any disclaimer, the term of this patent is extended or adjusted under 35 U.S.C. 154(b) by 636 days.

(21) Appl. No.: 14/547,371

(22) Filed: Nov. 19, 2014

(65) Prior Publication Data

US 2016/0140475 A1    May 19, 2016

(51) Int. Cl.
| | |
|---|---|
| G06Q 10/00 | (2012.01) |
| G06Q 10/06 | (2012.01) |
| G06Q 10/10 | (2012.01) |
| G06N 5/00 | (2006.01) |
| G06N 20/20 | (2019.01) |
| G06Q 40/02 | (2012.01) |
| G06F 16/951 | (2019.01) |
| H04W 4/029 | (2018.01) |

(52) U.S. Cl.
CPC ..... *G06Q 10/06395* (2013.01); *G06F 16/951* (2019.01); *G06N 5/003* (2013.01); *G06N 20/20* (2019.01); *G06Q 10/06* (2013.01); *G06Q 10/06316* (2013.01); *G06Q 10/10* (2013.01); *G06Q 40/02* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 6,629,096 B1* | 9/2003 | Reddy | ............ | G06N 5/022 706/46 |
| 2002/0040312 A1* | 4/2002 | Dhar | ............ | A61J 9/00 705/7.26 |
| 2004/0249832 A1* | 12/2004 | Goldthorpe | ............ | G06Q 10/06 |
| 2010/0198661 A1* | 8/2010 | McMurray | ............ | G06Q 30/06 705/7.28 |
| 2011/0258008 A1* | 10/2011 | McNair | ............ | G06Q 10/06 705/7.11 |

* cited by examiner

*Primary Examiner* — Gurkanwaljit Singh
(74) *Attorney, Agent, or Firm* — Hunton Andrews Kurth LLP

(57) ABSTRACT

A method and apparatus for assessing the health of a process is provided where the health of a client's process is assessed across a plurality of dimensions based on computing a process health index. The process health index is computed by determining a sub-process health index across a plurality of dimensions for the sub-processes comprising the process. The sub-process health index across different dimensions is determined based, at least in part, on responses to a set of evaluators and the dimensional weight value assigned to each of the dimensions. The response to each evaluator is an option selected from a plurality of weighted options. The sub-process health index is then stored. A process health index is calculated based on the sub-process health index for each sub-process across a plurality of dimensions and the sub-process weight value assigned to each of the sub-processes. The process health index is stored and used to assess the health of a client's process.

17 Claims, 11 Drawing Sheets

SYSTEM AND METHOD FOR ASSESSING CLIENT PROCESS HEALTH

FIELD OF THE DISCLOSURE

The present disclosure generally relates to assessing a client's process health, and is more specifically related to assessing the health of the client's business process across different dimensions.

BACKGROUND OF THE RELATED ART

A business process or business method is a collection of related, structured activities or tasks that produce a specific service or product (serve a particular goal) for a particular customer or customers. It can often be visualized with a flowchart as a sequence of activities with interleaving decision points, or with a Process Matrix as a sequence of activities with relevance rules based on data in the process. A business process can be decomposed into several sub-processes, which have their own attributes, but also contribute to achieving the goal of the super-process. The analysis of business processes typically includes the mapping of processes and sub-processes down to an activity level.

Business Processes are designed to add value for the customer and typically should not include unnecessary activities. The usual outcome of a well-designed business process is increased effectiveness (value for the customer) and increased efficiency (less costs for the company).

The business processes are known to focus on aspects such as quality improvement, cost reduction, delivery-time reduction and other similar parameters for assessing their performance. For these, various sub-processes, such as software development processes, business transaction processes and the like, of the business process are assessed. This methodology followed by conventional methods for assessment of a business process does not substantially address the need for improving the business process and the need for making the business process a mature business process. Typically, a business process encompasses activities and features that can be grouped across one or more dimensions. These dimensions refer to different aspects across which a business process can be assessed. For example, a business's process for closing journal entries can be assessed in terms of technology, the business's policies, and operating model. Most products for assessing client health do not offer efficient qualitative evaluation of process health across various dimensions.

Existing products for measuring the health of business processes are based on one or more Business Process Maturity (BPM) models that are developed to guide such business processes for achieving high performance and efficiency. Models are used to assess processes, including business processes. A model may consist of a series of states that describe how well the behaviors, practices and processes of an organization can reliably and sustainably produce required outcomes. Examples of BPMs include Capability Maturity Model (CMM) and Capability Maturity Model Integration (CMMI). Most BPM models assess the health of a business process by rating the process on maturity levels, which are defined according to the BPM model. For example, CMMI utilizes the following levels: Initial (Level 1), Repeatable (Level 2), Defined (Level 3), Quantitatively Managed (Level 4), and Optimizing (Level 5). The maturity levels are rated best to worst, with Level 5 being the notional ideal state where processes would be systematically managed by a combination of process optimization and continuous process improvement. A process is assigned one of the 5 maturity levels according to standards and tests defined by the CMMI.

The conventional methodology for assessing and improving the maturity level of a business process follows performance based evaluations. The conventional methodology is based on measuring performance-related parameters, such as key performance indicators (KPIs), of the business process. With this measurement, only the quantitative performance of the process with respect to benchmark performances is evaluated. Also, by measuring only the KPIs, an improvement roadmap for the business process typically cannot be estimated and projected. The improvement roadmap is usually essential for the evolution of the business process to achieve a higher maturity. Most solutions for assessing process health focus on assessing the process as per the various available BPM models. These solutions focus only on assigning a maturity level to the health of a business process. The available solutions define how capable the business process is to meet the client's business objective without any qualitative or quantitative analysis. A business process is said to be healthy if the client's business objectives are met efficiently and effectively.

In light of the limitations of the above mentioned products and solutions, there is a need for a process health assessment tool to assess the health of a client's business process across different dimensions in a quantitative and qualitative manner.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
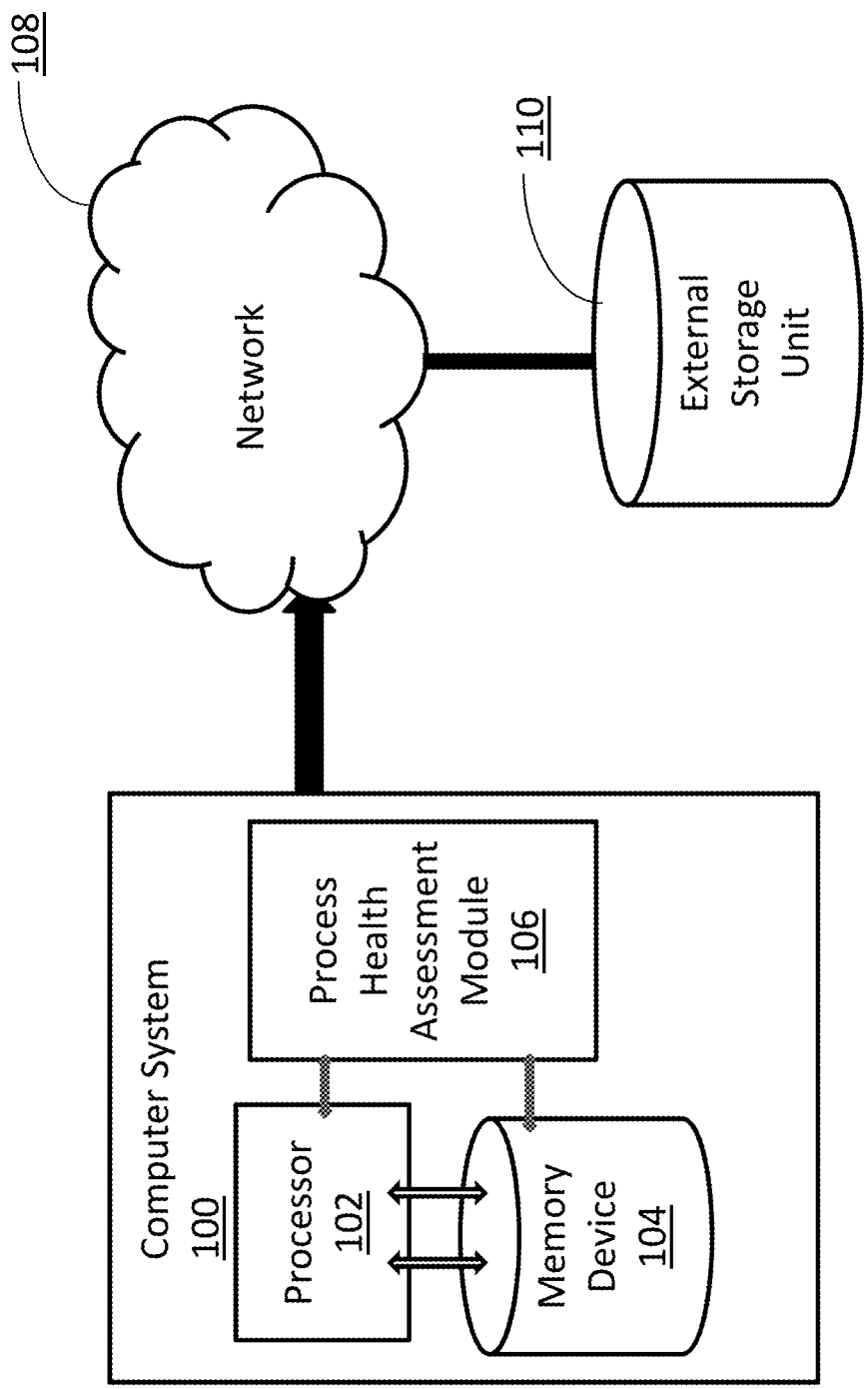
FIG. 1 illustrates an example computer environment suitable for implementing the example systems and methods for assessing client process health disclosed.

The following description of example methods and systems is not intended to limit the scope of the description to the precise form or forms detailed herein. Instead the following description is intended to be illustrative so that others may follow its teachings.

In the following disclosure, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

Several features are described hereafter that can each be used independently of one another or with any combination of other features. However, an individual feature might only address one of the problems discussed above. Some of the problems discussed above might not be fully addressed by any of the features described herein. Although headings are provided, information related to a particular heading, but not found in the section having that heading, may also be found elsewhere in the specification.

General Overview

Techniques for assessing the health of a client's process across different dimensions are described. The following computer-implemented steps are performed in accordance with one embodiment of the present disclosure. The health of a client's process is assessed across a plurality of dimensions based on computing a process health index. The process health index is computed by determining a sub-process health index across a plurality of dimensions for the sub-processes comprising the process. The sub-process health index across different dimensions is determined based, at least in part, on responses to a set of evaluators and the dimensional weight value assigned to each of the dimensions. The dimensional weight values are assigned based on the organization's evolution stage and client priorities. The response to each evaluator is an option selected from a plurality of weighted options. The sub-process health index is then stored. A process health index is calculated based on the sub-process health index for each sub-process across a plurality of dimensions and the sub-process weight value assigned to each of the sub-processes. The process health index is stored and used to assess to the health of a client's process.

As used herein, "client" may be any institution or organization that uses various business processes to conduct their business activities. For example, public or private corporations, banks, law firms, government departments, corporative societies, trusts, and not-for-profit organizations.

As used herein, "health of a process" refers to the current state or maturity level of a process. The maturity level of the process is usually one of several pre-defined maturity levels which vary according to the BPM model being used to assess the process health. One example of a set of pre-defined maturity levels for a BPM model (the "Genpact BPM Model") used in one embodiment of the present disclosure is: Trailing (Level 1), Evolving (Level 2), Maturing (Level 3), and Leading (Level 4). Each maturity level provides a snapshot of the state of the health of the process.

These maturity levels are defined according to standards and practices outlined in the Genpact BPM Model. Trailing is the initial level of process maturity stage, where processes are immature, resulting in inefficiencies & ineffectiveness. At this stage, business processes are loosely structured with no defined framework/boundaries. At the Trailing level, process risks are usually high and unidentified, which could result into a recurrent negative impact to the client. At the Evolving stage, clients respond to circumstances circumventing their business process and, accordingly, can adapt the process. Processes at this stage are more reactive in nature, with no strategic focus on driving efficiencies and effectiveness. Further, the process risks are high, but identifiable. Thus, clients can make changes to adapt and avoid reoccurrence of risks and errors. Processes at the Maturing stage are evolved enough to swiftly adjust to dynamic business environments. Business operations are defined and structured to be scalable with agility. Moreover, the efficiency and effectiveness component is high. Also, all of the potential risks are identified, and a mitigation plan is baked into the process design. Leading stage is the optimal/ideal stage where business processes are transformed across all dimensions resulting in a sustainable, standardized, scalable and flexible model. The Leading level may also be considered as an aspirational level for clients, for example, having a single enterprise resource plan (ERP) across all locations and business units. At this stage, risk management is institutionalized by the client for all the dimensions across which a business process may be assessed. An illustration depicting the various maturity levels for a particular process are represented below:

|  | Trailing | Evolving | Maturing | Leading |
| --- | --- | --- | --- | --- |
| Is a detailed closing calendar maintained for tracking and monitoring month-end financial close activities? | No Close Calendar maintained | Disintegrated Close Calendar for each business unit/location | Single close Calendar being followed across business unit/location | Single close Calendar with critical path defined for activities, identifying dependent and independent activities, target and completion date defined, activity owner and |

-continued

| | Trailing | Evolving | Maturing | Leading |
|---|---|---|---|---|
| | | | | reviewer name, escalation matrix defined |
| Explanation —— | | | | |
| Financial close consist of series of critical activities, progress for each of those activities needs to be monitored rigorously. Delay in any of these critical activities may result in a delay in closing and reporting of financials. The monitoring of activities is undertaken through a chronological activity calendar. | Clients will have no tracking mechanism for their financial close processes. In this scenario, the close processes will be at high risk of delay & controllership issues. Hence, such state has been assigned the lowest maturity level in this BPM model. | Clients will have close calendar defined. However, these calendars are subject to individual discretions and are inconsistent. The activities are not segregated as critical and non-critical. This scenario lacks holistic enterprise view of close processes | Close calendar has been defined uniformly with defined roles and responsibilities across businesses/locations for a proactive enterprise view on close process. | Best in class clients will have in place a comprehensive close calendar incorporating all the key criteria/for effective tracking of financial close processes. At this stage, the calendar is institutionalized to ensure timely and effective financial close |

The various maturity levels are defined in terms of a continuous scale of process health index values. For example:

| Process Health Index Value/Score | Maturity Level |
|---|---|
| 1-2 | Trailing |
| 2-3 | Evolving |
| 3-4 | Maturing |
| 4 | Leading |

As used herein, the term "dimension" refers to the area of interest on which the process is assessed. It also refers to the structure/area/data set composed of unique evaluators that categorize and measure performance. It is a broad grouping of evaluators that facilitate granular analysis, evaluation and comparison. Some examples of commonly used dimensions in business are process, people, technology, product, organization structure, etc. Each evaluator in the set of evaluators is associated with one or more of these dimensions. These dimension vary according to the BPM model, or the tool used for assessment. The choice of BPM models or tools is further affected by a client's needs and requirements. In an embodiment of the present disclosure, the BPM model used assesses the process across six dimensions, namely: Process, Policy, Technology, Operating Model, Metric, and Controls. In another embodiment, each dimension has a series of associated qualitative evaluators to assess the process across each dimension. These evaluators may be multiple-choice type questions.

Process, as referred herein, is described as a systematic series of independent and linked steps which consume one or more of the resources (e.g. employee, time, energy, money, and machine) to convert inputs (e.g. data, material, etc.) into outputs. These outputs then serve as inputs for the next stage until a known goal or end result is achieved. Assessing a business process across the process dimension includes, but is not limited to, answering questions related to roles, entry criteria, inputs, activities, outputs, exit criteria, reviews and audits, work products managed and controlled, measurements, documented procedures, training, and/or tools. For example, for a reconciliation process the related evaluators may be questions based on the procedure for reconciling balances, review process, checklist, and documentation.

Policy refers to the basic principles and associated guidelines, formulated and enforced by governing body, internal or external, of an organization to direct or limit actions in pursuit of end objectives. Policy may be a document in the form of a hard or soft copy which is used as a reference guide while carrying out business processes. Policy dimension, as referred to herein, may include, but is not limited to, the following elements: Criteria and conditions, threshold limits, communication plan, Prioritizations, escalation mechanism, etc. For example, in reconciliation process a policy may include guidelines on frequency of reconciliation, escalation mechanism, steps for resolution of open items, definition of unreconciled items, etc.

Technology is the type and level of sophistication used by a process or sub-process, and can have a significant impact on business processes and end results. Improved technology can impact business processes by improved communications, better management information systems, effective monitoring and real time visibility, etc. For example, in a process involving month-end closing, the process may be tracked or monitored based on the software tools with different levels and degrees of sophistication, like an MS Excel, ERP, or a stand-alone tool.

Operating Model is an abstract representation of how a business is structured and how it operates across key areas in order to accomplish its functions or end objectives. The Operating Model highlights the required business processes for the organization and the key parts of the organization and how these are interrelated to one another. Capacity, people, infrastructure, governance, and communication are some of the key elements of an operating model. For example, a Decentralized model where the process teams are fragmented across multiple locations is best suited for processes like forecasting. However, for transactional processes, the defined Center of Excellence (CoE) model is recommended where teams are consolidated in a shared facility.

Metric of a Process refers to a performance indicator. A performance metric is a tool that measures an organization's behavior and performance for a specific process or activity that is crucial for the success of the client. The performance metric should support a range of stakeholder needs from customers, to shareholders, to employees. Developing performance metrics usually follows a process of establishing critical processes/customer requirements; identifying specific, quantifiable outputs of work; and establishing targets against which results can be scored. For example, for Reconciliation Processes, the Key Performance Indicators (KPI) can be time to reconcile (i.e. a measurement of the time spent on reconciling accounts) and percentage of open item (i.e. a measurement of the number or monetary value of transactions outstanding for reconciliation after the period end). While traditionally many metrics are finance based, inwardly focusing on the performance of the organization, metrics may also focus on the performance against customer requirements and value.

Controls are defined as systems and procedures to account for possible errors in the business process. Controls can be built into manual/administrative processes and sub-processes and/or computer implemented process. It is advisable to build in adequate controls, since these controls provide checks to maintain process integrity. For instance, in a computer implemented process for receiving entries of quantity of raw materials, an error message about an entry of a received raw material quantity exceeding the purchase order quantity by greater than the permissible tolerance percentage can be displayed and will prevent the entry of such a quantity. However, for various reasons such as practicality, the need to be "flexible," the lack of business domain knowledge and experience, and the incapability of a computerized system to provide controls, all controls otherwise considered to be necessary are often not built into business processes. In such scenarios, the manual, administrative process controls are clearly documented, enforced and regularly exercised. For instance, while entering data to create a new record in a material system database's item master table, the only control that the computer system can provide over the item description field is not to allow the user to leave the description blank—in other words, configure item description as a mandatory field. The system obviously cannot alert the user that the description is wrongly spelled, inappropriate, nonsensical, etc. In the absence of such a computer system-based control, the item creation process must include a suitable administrative control through the detailed checking, by a responsible officer or department, of all fields entered for the new item, by comparing a print-out taken from the system with the item data entry sheet, and ensuring that any corrections in the item description (and other similar fields where no system control is possible) are promptly carried out.

As used herein, the terms "dimensional weight value" and "sub-process weight value" refer to the numerical weights assigned to the dimensions and the sub-processes, respectively. Dimensional weight values and sub-process weight values are assigned based on an organization's evolution stage, the dimension's or the sub-process's impact on overall business, and/or client priorities.

As used herein, the term "weighted options" refers to the options associated with each evaluator from which the user selects the response. Each option is assigned a numerical weight. The options correspond to the maturity levels in the BPM model used, and the weights assigned to each option reflect the associated maturity level. For example, an option associated with a higher maturity level has a higher numerical weight than an option associated with a lower maturity level.

In another embodiment, the present disclosure encompasses receiving a target health index. Once the process health index is calculated, it is compared against the target health index and the result of this comparison is displayed via statistical & graphical representations.

In another embodiment, the present disclosure encompasses receiving the health index of a best-in-class process. Once the process health index is calculated, it is compared against the best-in-class index and the result of this comparison is displayed via statistical and graphical representations.

As used herein, the phrases "best-in-class" or "best practices" arise from the management tool known as "benchmarking" The assumption underlying this term is that production and management processes are uniform enough so that a "best-in-class" or "best practice" can be identified and then adopted more or less "as is" by another entity. For example, as is clearly the case in technical areas, the adoption of a "best practice" by others may be blocked by patent protection. When the concept is applied to management procedures, however, the transferability of "best practices" may be more difficult to accomplish. Benchmarking programs attempt to identify best practices in a sector, an industry, or a cluster of competitors. Best practices are quantified to the extent possible by developing measurements and then comparing the numbers to similarly developed values inside the surveying operation. Some firms are so well-known for best practices in certain areas that it is not necessary to consult books, magazines, libraries, the Internet, etc. to find the information. For example, Federal Express is often cited as having best practices among competitors in the expedited small package industry for their on-time delivery and package tracking services. Likewise, Microsoft, the computer software developer, is cited as being innovative and creative, while the L. L. Bean outdoor products and clothing company is frequently lauded for its customer service practices and return policy guarantees. However, in most cases, "best practices" or "best-in-class" processes are identified through research and observation of companies in a wide variety of settings, countries, and industries. It is also possible to identify best practices by examining professional journals and business periodicals. Companies that win various awards often exhibit best practices to emulate.

In other embodiments, the present disclosure encompasses a non-transitory computer-readable medium configured to perform the foregoing methods or steps.

System Overview of Example Embodiments

FIG. 1 illustrates an example computer-networking environment for implementation of at least one embodiment of the present disclosure. In one embodiment, the computer system 100 comprises a computing device configured as a management station, and such may be structured as the example computing device described herein in the "Hardware Overview" section. In another embodiment, the computer system 100 may be a specialized computing device. For example, the computer system 100 may be a video infrastructure or audio infrastructure device that is optimized for services such as video conferencing, digital telephony, and/or telepresence. In still other embodiments, the computer system 100 may represent network end stations such as laptop computers, server computers, mobile computers, tablet computers, smartphones, etc., or may represent software components executing on one or more computing systems. In still another embodiment, the computer system 100 may represent several different interconnected computers or computer systems operating as a cloud-based computing system.

In an embodiment, the computer system 100 comprises a processor 102, a memory device 104, and a process health assessment module 106. The processor 102 may be a general purpose microprocessor as described in the "Hardware Overview" section. The processor 102 may be composed of one or more microprocessors. The memory device 104 may be a general storage device, as described in the "Hardware Overview" section. In one embodiment, the memory device 104 may be a specially configured, network enabled, solid state drive. In yet another embodiment, the memory device 104 may be a RAID array.

In one embodiment, the process health assessment module 106 may be implemented as an application with a graphical user interface executing on the computer system 100 to assess the health of a process. The process health assessment module 106 may be implemented as an application with a graphical user interface executing across separate interconnected computer systems, as described herein.

In an embodiment, the computer system 100 is connected to an external storage unit 110 through a network 108. The network 108 may represent any combination of one or more local networks, wide area networks, or internetworks coupled using wired or wireless links deployed using terrestrial or satellite connections. Data exchanged over the network 108 may be transferred using any number of network layer protocols, such as Internet Protocol (IP), Multiprotocol Label Switching (MPLS), Asynchronous Transfer Mode (ATM), Frame Relay, etc. Furthermore, in embodiments where the network 108 represents a combination of multiple sub-networks, different network layer protocols may be used at each of the underlying sub-networks. In some embodiments, the network 108 may represent one or more interconnected internetworks, such as the public Internet.

In an embodiment, the external storage unit 110 may be one or more storage devices attached to the central server of a client institution. In another embodiment, the external storage unit 110 may be an off-site storage or backup device. In still another embodiment, the external storage unit 110 may be the storage device of another computer system similar to the one described above, or one described in the "Hardware Section" herein. In another embodiment, the external storage unit 110 may be one or more separate storage devices on the computer system 100 that are configured as a centralized storage which can store data associated with the assessment of all processes undergoing assessment by the process health assessment module 106. In another embodiment, the external storage unit 110 is configured as a shared storage for clients to upload data pertaining to their processes that are to be assessed by the process health assessment module 106. In yet another embodiment, the shared client data comprises responses to the set of evaluators for computing process health index. In an embodiment, the external storage unit 110 may be configured to store data related to best-in-class practices, which can be accessed by clients via a network link.

Although only a particular number of elements are depicted in FIG. 1, a practical environment may have many more of each depicted element. For example, the computer system 100 may be communicatively coupled to the external storage unit 110 directly or indirectly through one or more networks. The computer system 100 may have one or more processors and one or more storage devices. Further, there may be more than one instance of the process health assessment module 106 executing on the computer system 100 simultaneously.

Overview of the Process Health Assessment Module

Figure 2:
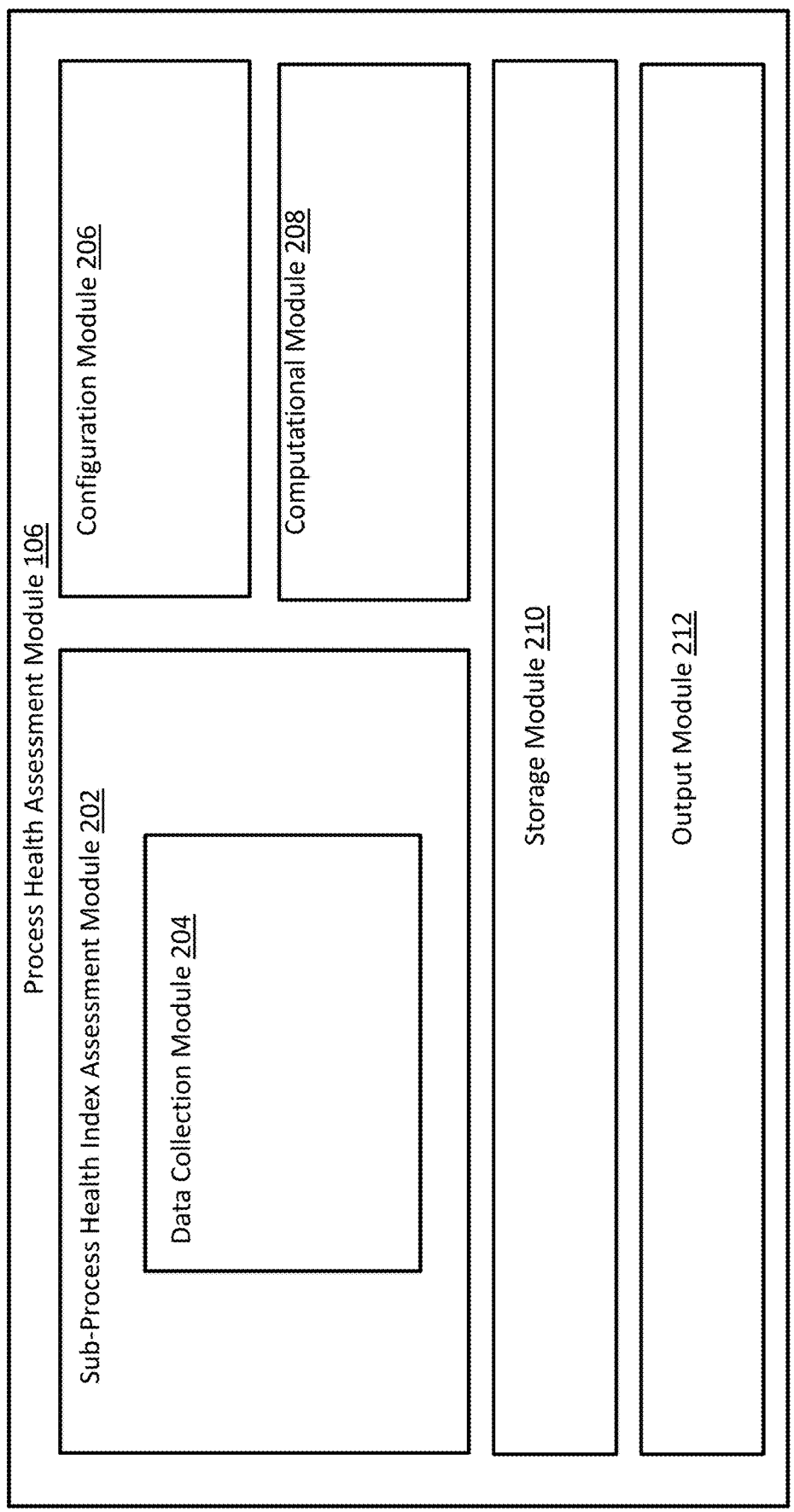
FIG. 2 illustrates in block diagram form an example embodiment of the process health assessment application of the present disclosure.

FIG. 2 illustrates a block diagram of a more detailed example embodiment of the process health assessment module 106. It will be appreciated that, although FIG. 2 illustrates a process health assessment module 106 on a single computing device, other embodiments may implement the process health assessment module 106 across a number of different computing devices.

In an embodiment, the process health assessment module 106 comprises a sub-process health assessment module 202, a configuration module 206, a computational module 208, a storage module 210, and an output module 212.

The sub-process health assessment module 202 may be implemented as an application with a graphical user interface to determine the sub-process health index of the sub-processes belonging to the process being assessed. In one embodiment, the sub-process health assessment module 202 may be implemented as a standalone application executing on a computer system separate from the computer system 100. The sub-processes undergoing assessment to determine their sub-process health index may be selected by the user. Alternatively, the sub-processes may be selected automatically by the sub-process health assessment module 202.

In one embodiment, the sub-process health assessment module 202 comprises a data collection module 204. The data collection module 204 may be used to collect responses to the set of evaluators for determining the sub-process health index. The data collection module 204 may also be implemented as an application with a graphical user interface to collect responses to a set of qualitative evaluators to determine the sub-process health index of the sub-processes. In still another embodiment, the data collection module 204 may be implemented as a standalone application executing on a computer system separate from the computer system 100. The data collection module 204 may comprise subject matter experts that collect responses to a set of evaluators from other subject matter experts in the client's industry to determine the sub-process health index for the various sub-processes.

In one embodiment, the configuration module 206 may be a processor as defined in the "Hardware Overview" section below. The configuration module 206 may comprise software and/or hardware components that receive information about the process under assessment from the process health assessment module 202. In another embodiment, the configuration module 206 may comprise software and/or hardware components that receive configuration data. The configuration data may specify, for example, at least one of dimensional weight values, sub-process weight values, and optional weight values to assess the health of a process. In another embodiment, the configuration data may specify the sub-processes to assess the health of a process. In yet another embodiment, the configuration data may specify the dimensions, across which the processes health is assessed. In another embodiment, the configuration data may specify the target health level against which the client's process health level is to be assessed. In an embodiment, the configuration data may specify the process health level of a best-in-class process for comparison with the client's process health level The computational module 208 may comprise software and/or hardware components that compute the process health index for a client's process based on the sub-process health index of the sub-processes of the process and the sub-process weight value assigned to each sub-process. In an embodiment, the computational module 208 may comprise software and/or hardware components that compute the sub-process health index based on responses to a set of evaluators associated with dimensions across which the health of the client's process is being assessed and the dimensional weight values assigned to the dimensions. The computational module 208 may be implemented as a logic module to do logic operations. In another embodiment, the computational module 208 may be used to compare two or more process health levels.

The storage module 210 may be a memory device as described above. In another embodiment, the storage module 210 comprises software and/or hardware components that store the sub-process health indices, the process health indices, and other information related to process health assessment for all processes and sub-processes undergoing health assessment by the process health assessment module 202.

The output module 212 may be an output device, such as a monitor, printer, projector, and/or speakers associated with the computer system 100, that outputs the results of the process health assessment. In another embodiment, the output module 212 comprises hardware and/or software components to output the results of comparison between a process health index and a target health index. In yet another embodiment, the output module 212 comprises hardware and/or software components to output the results of comparison between a process health index and the process health index of a best-in-class process.

Overview of a Method for Evaluating the Health of a Process

Figure 3:
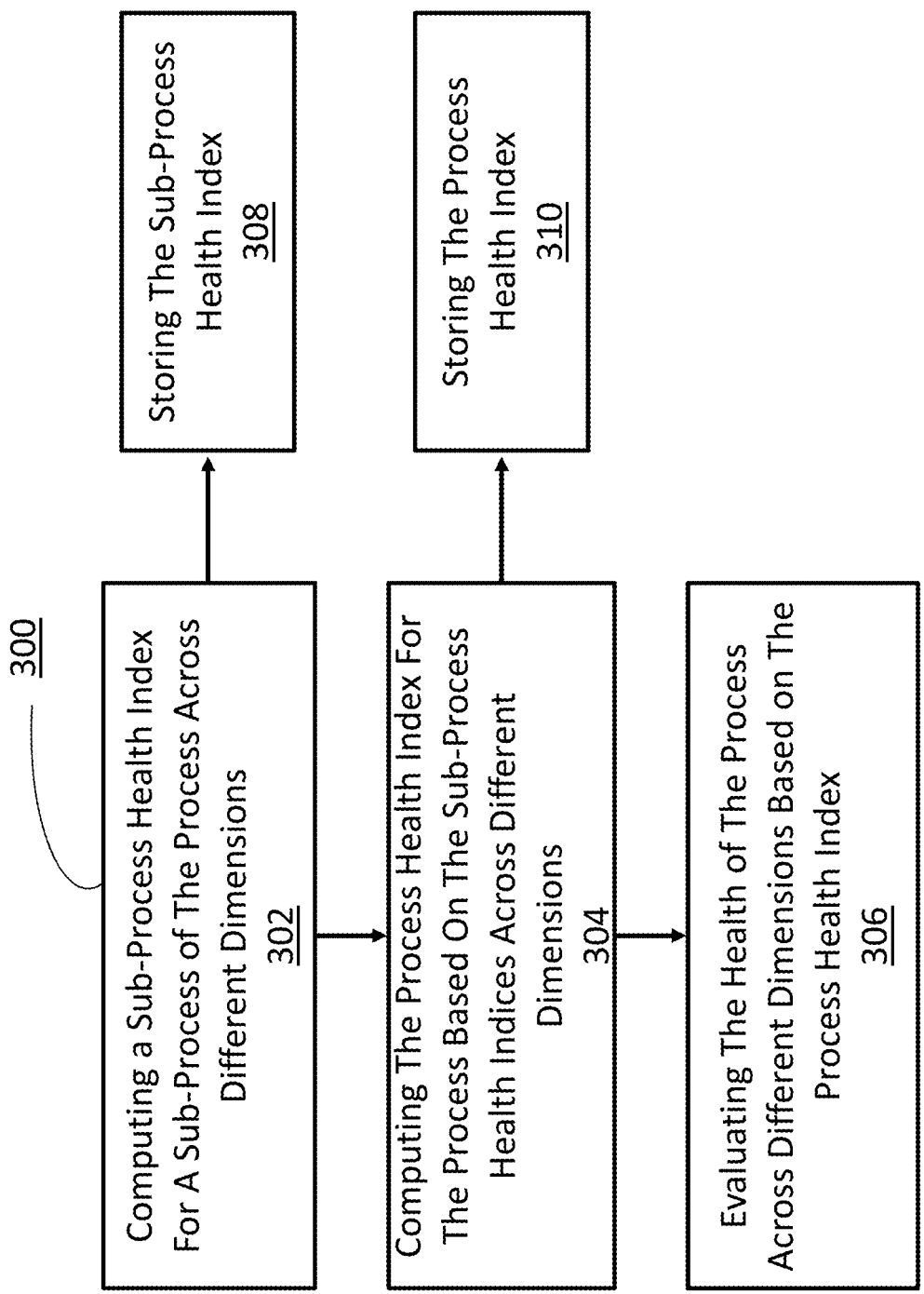
FIG. 3 illustrates an example process for assessing the health of a process across different dimensions in an embodiment of the present disclosure.

FIG. 3 illustrates a process for assessing the health of a particular process by the process health assessment module 106, according to the preferred embodiment. For purposes of illustrating clear examples, the process flow depicted in FIG. 3 will be discussed in connection with the process health assessment module 106 of FIGS. 1 and 2. However, a same or substantially similar process can be used for other implementations.

At block 300, the process health assessment module 106 receives a process for assessment across different dimensions along with the dimensional weight values associated with the dimensions and the sub-process weight values associated with each of the sub-processes belonging to the process. In an embodiment, the dimensional weight values are based on an organization's evolution stage and the importance of a dimension to a particular sub-process. In another embodiment, the sub-process weight values are derived from investment priorities for improving the process and client priorities. In yet another embodiment, the dimensional weight values vary based on the process. In still another embodiment, the dimensional weight values vary based on the sub-processes. In one embodiment, the sum total of all dimensional weight values is 1. In another embodiment, the sum total of all sub-process weight values is 1. For example, the process health assessment module 106 may receive a process "Y" to be assessed across a number of different dimensions D1, D2, and D3 according to the Genpact BPM Model with the maturity levels Trailing, Evolving, Maturing, and Leading. Process Y may be composed of sub-processes Y1, Y2, and Y3. The associated dimensional weight values may be dw1, dw2, and dw3. The associated sub-process weight values may be sw1, sw2, and sw3. In an example, the Record to Report process for the accounting department of a client is the process to be assessed across a variety of dimensions, for example, policy, technology, and operational model according to the Genpact BPM Model. Here, the sub-processes may include Fixed Asset Accounting, Inter-company, and Reconciliation, and the assigned sub-process weights may be 0.1, 0.3, and 0.6, respectively. The dimensional weight values assigned to policy, technology, and operating model may be 0.2, 0.4, and 0.4, respectively.

At block 302, the process health assessment module 106 passes the process undergoing assessment to the sub-process health assessment module 202, which calculates the sub-process health index for at least one sub-process belonging to the process across at least one dimension. For example, the sub-process health indices as determined for Y1, Y2, and Y3 may be SPHI1, SPHI2, and SPHI3, respectively. Similarly, the sub-process health indices in the above example as determined for Fixed Asset Accounting, Inter-company and Reconciliation may be 3.5, 3.6, and 3.3, respectively. In an embodiment, the sub-process health index may be calculated for each process across each dimension. In another embodiment, the sub-process health index may be calculated for sub-processes that are selected by the client. In an embodiment, the sub-process health index may be calculated across dimensions selected by the client. In another embodiment, both the sub-processes and the dimensions across which the sub-process health index for those sub-processes is to be calculated are selected by the user.

At block 308, the sub-process health indices calculated at block 302 for every sub-process that was assessed are stored via the storage module 210. Thus, in a continuation of the example above, SPHI(Y1), SPHI(Y2), and SPHI(Y3) are stored via the storage module. Similarly, the sub-process health indices for Fixed Asset Accounting, Inter-company and Reconciliation (i.e. 3.5, 3.6 and 3.3) are stored.

At block 304, the process health index is computed based, at least in part, on the sub-process health indices determined at block 302 and the sub-process weight values. In one embodiment, the process health index is computed by aggregating the product of the sub-process health index and the sub-process weight value for each sub-process assessed. For example, the process health index (PHI) for process Y from the above example is calculated as follows:

$$PHI(Y)=SPHI(Y1) \times sw1 + SPHI(Y2) \times sw2 + SPHI(Y3) \times sw3$$

Similarly, the process health index for the example Record To Report is calculated as follows:

$$3.5 \times 0.1 + 3.6 \times 0.3 + 3.3 \times 0.6 = 3.41$$

Thus, the process health index for Record To Report process is 3.41.

At block 310, the process health index calculated at block 304 is stored via the storage module 210. Thus, in a continuation of the example above, PHI(Y) is stored via the storage module. Similarly, the process health index for a client across the dimensions policy, technology, and operating model for closing journal entries is 3.41, which is stored via the storage module 210.

At block 306, the health of the process is assessed based, at least in part, on the process health index. In an embodiment, the process health index is assessed to determine the current health level (i.e. maturity level) based on the BPM model being used. For instance, in the above example, for Record to Report process which is assessed on the Genpact BPM Model as described above, a process health index of 3.41 indicates that the process is at the Maturing level of the Genpact BPM maturity model. In one embodiment, the health level of a process is submitted to the client's senior management to review the health of process. Based on the assessment of the health of the process, the senior management may decide whether to continue to expedite resources to improve the process. In one embodiment, the health of the process may be assessed periodically to determine areas of improvement and areas still needing improvement.

Overview of a Method for Determining a Sub-Process Health Index

Figure 4:
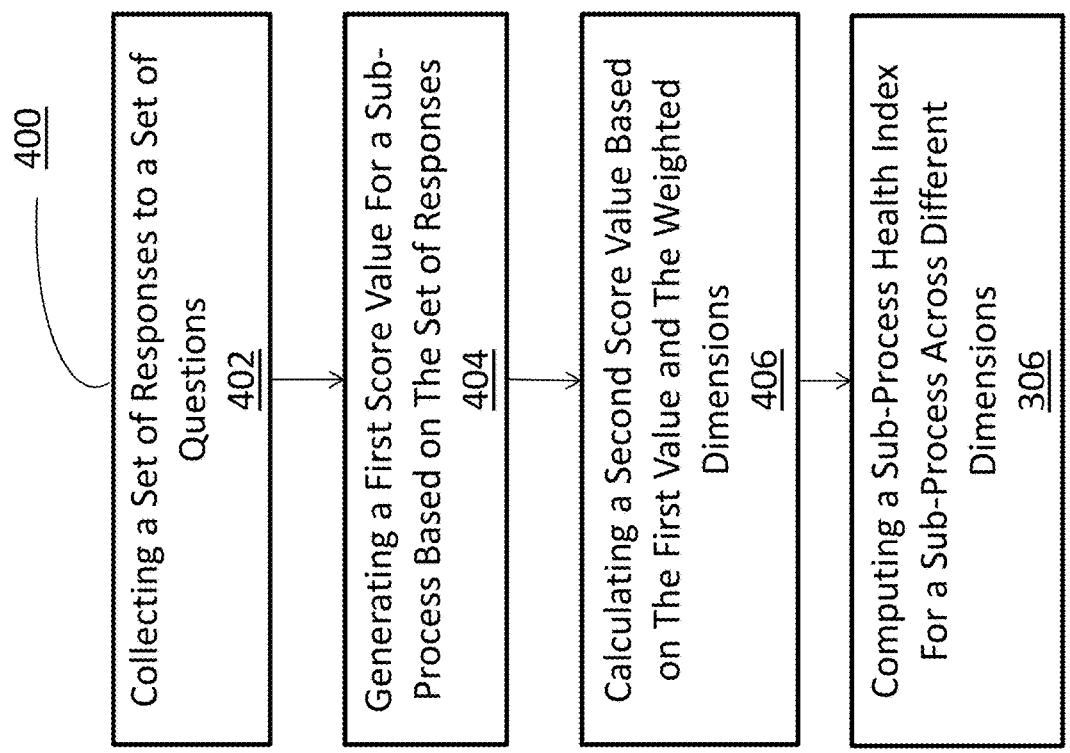
FIG. 4 illustrates in flowchart form an example process for assessing the health of a sub-process across different dimensions in an embodiment of the present disclosure.

FIG. 4 illustrates a process for determining a sub-process health index of a particular sub-process across at least one dimension by the sub-process health assessment module 106, according to the preferred embodiment. For purposes of illustrating clear examples, the process flow depicted in FIG. 4 will be discussed in connection with the sub-process health assessment module 202 of FIG. 2. However, a same or substantially similar process can be used for other implementations.

At block 400, the sub-process health index assessment module 202 receives at least one sub-process belonging to the process undergoing assessment by the process health assessment module 106, along with at least one dimensional weight value for dimensions across which the sub-process will be assessed by the sub-process health assessment module 202. In an example embodiment, the sub-process health assessment module 202 receives sub-processes Y1, Y2, and Y3, to be each evaluated across dimensions D1, D2, and D3 with dimensional weight values dw1, dw2, and dw3. Similarly, the sub-process health assessment module 202 may receive the sub-processes Fixed Asset Accounting, Intercompany and Reconciliation to be evaluated across the dimensions policy, technology, and operating model, which may be assigned dimensional weights 0.2, 0.4, and 0.4, respectively.

At block 402, a set of responses are collected to a set of evaluators. In an embodiment, each evaluator in the set of evaluators is associated with at least one dimension and one sub-process. In another embodiment, each response in the set of responses is a weighted option selected from different weighted options. Each weighted option may be assigned an option weight value or score. In one embodiment, the number of different options for each evaluator may be equal to the number of maturity levels according to the BPM model being used. Each option may represent one maturity level. The optional weight value of the different options associated with each evaluator may be based on the maturity levels. For example, the Genpact BPM Model has four maturity levels, and therefore each evaluator in the set of evaluators has four options attached to it. Furthermore, each option may represent one of the four maturity levels, and may be assigned an optional weight value according to the maturity level it represents. Thus, an option that represent the Trailing maturity level may have an optional weight value or score of 1, an option that represents the Evolving maturity level may have an optional weight value or score of 2, an option that represents the Maturing maturity level may have an optional weight value or score of 3, and an option that represents the Leading maturity level may have an optional weight value or score of 4. In an embodiment, the set of responses for a dimension comprises the options selected by the client while responding to the set of evaluators associated with that dimension.

At block 404, a first score value is calculated for the sub-process being assessed across each dimension based on the set of responses and the number of evaluators in the set of evaluators. The first score value across a dimension may be calculated by dividing the sum of the option weight value of each response selected from the set of responses for that dimension by the number of evaluators in the set of evaluators for that dimension. For example, in continuation of the above example, the first score value for sub-process Y1 across D1, D2, and D3 may be calculated as:

$$FSY1(D1) = \Sigma \text{Option Weight Values of response set of } D1(ow(D1))/\text{Number of evaluators in } D1(n(D1))$$

$$FSY1(D2) = \Sigma ow(D2)/n(D2)$$

$$FSY1(D3) = \Sigma ow(D3)/n(D3).$$

In an embodiment, the first score value for a sub-process is calculated across each dimension. In another embodiment, the first score value for a sub-process is calculated across the dimensions selected by the client organization. The first score value may be stored via the storage module 210.

At block 404, a second score value for each dimension across which the sub-process is being assessed may be calculated based on the first score value and the dimensional weight assigned to the dimensions. In an embodiment, the second score value for a sub-process is calculated by taking the product of the first score value for the sub-process across a dimension and dimensional weight value for the dimensions. For example, in continuation of the example above, the second score value for sub-process Y1 across dimension D1, D2, and D3 may be calculated as:

$$SSY1(D1) = FSY1(D1) \times dw1$$

$$SSY1(D2) = FSY1(D2) \times dw2$$

$$SSY1(D3) = FSY1(D3) \times dw3.$$

In an embodiment, the second score values for a sub-process across different dimensions are stored via the storage module 210.

At block 406, the sub-process health index for a sub-process may be determined based on the second score values for the various dimensions across which the sub-process is assessed. In an embodiment, the sub-process health index is calculated by summing the second score values for each dimension across which the sub-process was assessed. For example, in continuation of the example above, the sub-process health index for Y1, Y2, and Y3 may be calculated as:

$$SPHI(Y1) = SSY1(D1) + SSY1(D2) + SSY1(D3)$$

$$SPHI(Y2) = SSY2(D1) + SSY2(D2) + SSY2(D3)$$

$$SPHI(Y3) = SSY3(D1) + SSY3(D2) + SSY3(D3).$$

Figure 5:
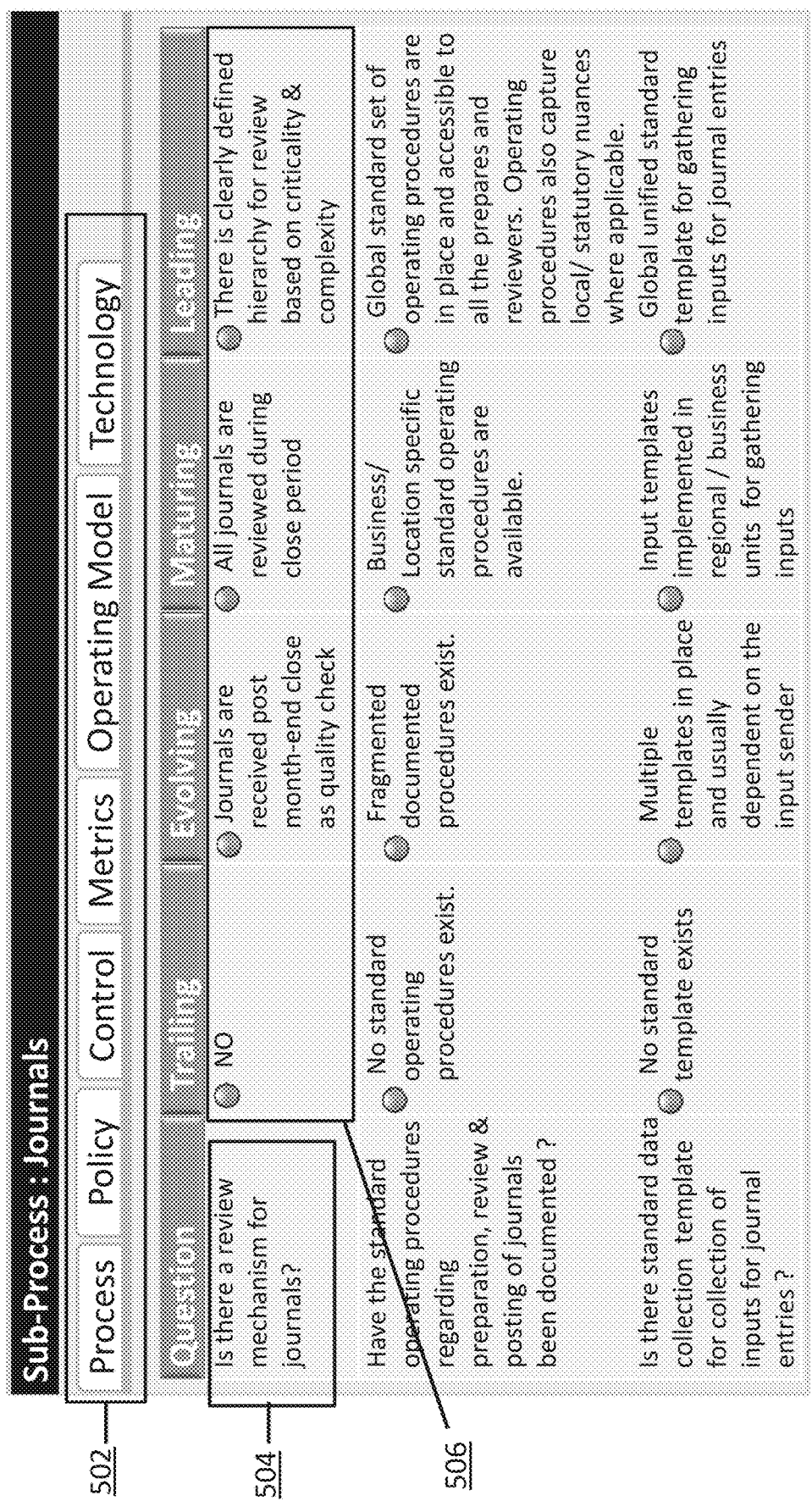
FIG. 5 illustrates an example graphical user interface displaying a set of evaluators and a set of weighted options for each evaluator in an embodiment of the present disclosure.

FIG. 5 illustrates an example graphical user interface displaying a set of evaluators and a set of weighted options for each evaluator in an embodiment. In an embodiment, the graphical user interface comprises a plurality of dimensions 502, an evaluator 504 in a set of evaluators for each of the plurality of dimensions 502, and a set of weighted options 506 for each evaluator 504.

In an embodiment, the plurality of dimensions 502 is determined by the BPM model being used to assess a process of a client. In another embodiment, any one of the plurality of dimensions 502 can be selected in any order. For example, in FIG. 5, the following dimensions: Process, Policy, Controls, Metrics, Operating Model, and Technology can be selected by selecting with an input device the appropriate tab on the graphical user interface.

The evaluators 504 in the set of evaluators may be determined according to the needs of the client. In an embodiment, the evaluators 504 in the set of evaluators are determined by the experts in the same field of business as the client. In another embodiment, the client has to answer each evaluator 504 in the set of evaluators. For example, the evaluator 504 on review of journals and the set of weighted options 506 illustrated in FIG. 5 is:
Evaluator: Is there a definite review mechanism for journals?
Option A: No.
Option B: Journals reviewed post month end close as a quality check.
Option C: All Journals are reviewed during the close process.
Option D: There is a defined hierarchy set up for review of journals based on criticality and complexity.

In an embodiment, optional weight values are determined according to an organization's evolution stage, and needs or priorities of the client for the specific dimension, sub-process, and process for which assessment is being carried out. In an embodiment, options in the set of weighted options 506 are arranged in increasing order of optional weight values associated with each option or response. In another embodiment, the options in the set of weighted options 506 are arranged in decreasing order of optional weight values associated with each option or response. In the example evaluator depicted in FIG. 5 and described above, the weighted options are arranged in increasing order of option weight value, with Option A having the lowest associated option weight value, and Option D having the highest associated option weight value. For example, if the evaluator 504 was a part of a process's health assessment using the Genpact BPM Model, then Option A would be associated with the Trailing maturity level, Option B with the Evolving maturity level, and so on. Furthermore, under the Genpact BPM Model, Option A would be assigned an option weight value of 1, Option B would be assigned an option weight value 2, Option C's optional weight value would be 3, and Option D's optional weight value would be 4.

Figure 6:
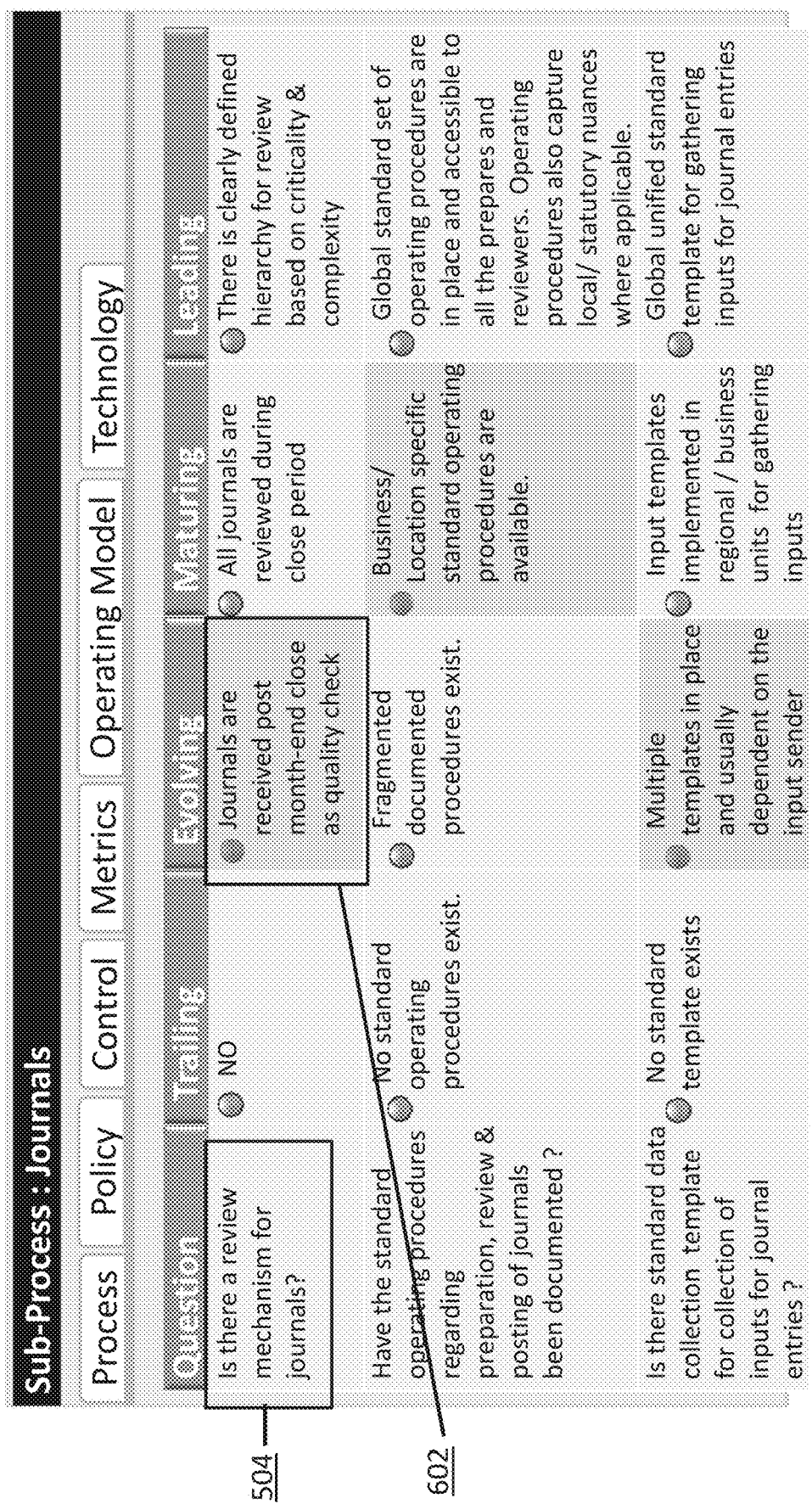
FIG. 6 illustrates an example graphical user interface displaying a set of evaluators and a set of responses in an embodiment of the present disclosure.

FIG. 6 illustrates an example graphical user interface displaying an evaluator 504 in a set of evaluators, and a response 602 in a set of responses in an embodiment of the present disclosure. The evaluator 504 may be one evaluator in a set of evaluators as described in FIG. 5. In an embodiment, the response 602 is an option selected from a plurality of options. In FIG. 6, the user selects Option B: "Journals reviewed post month end close as a quality check," as the response 602 to the evaluator 504 "Is there a definite review mechanism for journals?" Thus, the weight assigned to the response 602 under the Genpact BPM Model would be 2. This weight is then added to the weight of all responses, and the sum is divided by the number of evaluators to generate a first score value as defined above.

Figure 7:
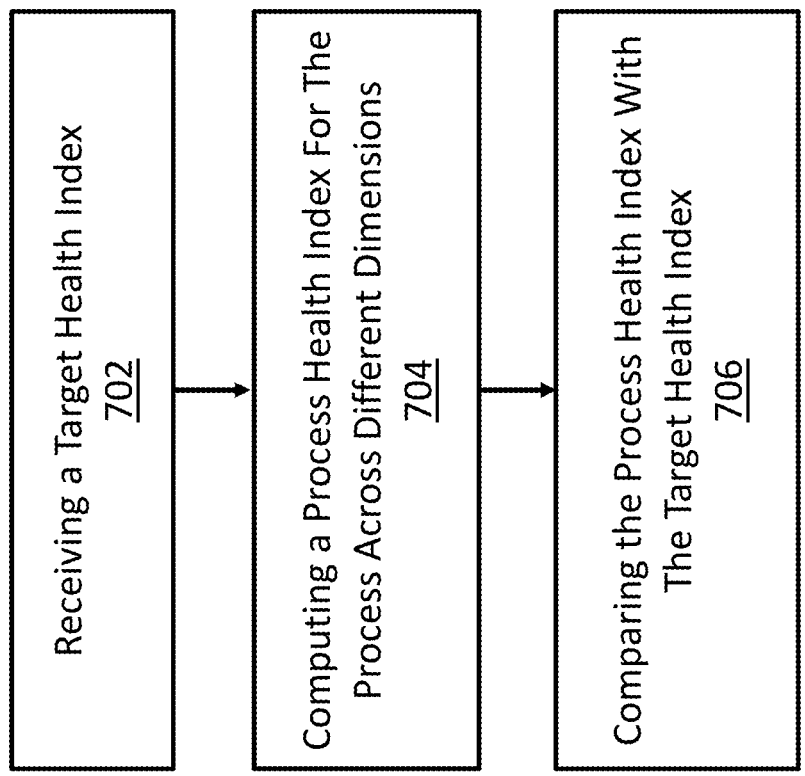
FIG. 7 illustrates an example process for assessing the health of a process against a target health index in an embodiment of the present disclosure.

Comparison of the Health of the Process with the Health of the Best-in-Class Process FIG. 7 illustrates an example process for assessing the health of a process against a target health index in an embodiment of the present disclosure. For purposes of illustrating clear examples, the process flow depicted in FIG. 7 will be discussed in connection with the process health assessment module 106 of FIGS. 1 and 2. However, a same or substantially similar process can be used for other implementations.

At block 702, the configuration module 206 receives a target health level a part of configuration data. In an embodiment, the target health level is received from the client. In another embodiment, the target health level is determined by the client based on the process for calculating a process health index described above by selecting options, optional weight values, dimensional weight values, and sub-process weight values that realize the aspirational process health level that the client wants to achieve for a particular process. In an embodiment, the target health level is a health index that the senior management of the client wants to achieve for a particular process. In another embodiment, the target health level is a value that lies on the maturity level scale of the BPM model that the client is using. In one embodiment, the client uses the Genpact BPM Model, and the target health level lies between zero and four. In another embodiment, the target health level can be a range on the maturity level scale. In an embodiment, the configuration module 206 receives a different target health level for each sub-process of the process. In yet another embodiment, the configuration module 206 receives more than one target health level. In still another embodiment, the target health level is a maturity level of the BPM model being used by the client. The target health level may be the highest or ideal maturity level of the BPM model in use by the client. The target health level for a process may also be less than the current health level of the process.

At block 704, the client's process health level is determined based on the process health index as described above. At block 706, the client's process health index and process health level is compared to the target health level by the computational module 208. In an embodiment, the comparison of the client's process health level and the target health level is expressed as a difference between the two. The difference between the two health levels may be represented as a percentage gap. For example, if the target health index is 3.5 and the client's process health index is 3.0, then the percentage gap is 0.5/3.5×100%=14.29%. In an embodiment, the comparison between the client's process health level and the target health level informs the client's management how to best spend resources to improve the client process.

Benchmarking the Health Index of the Process

Figure 8:
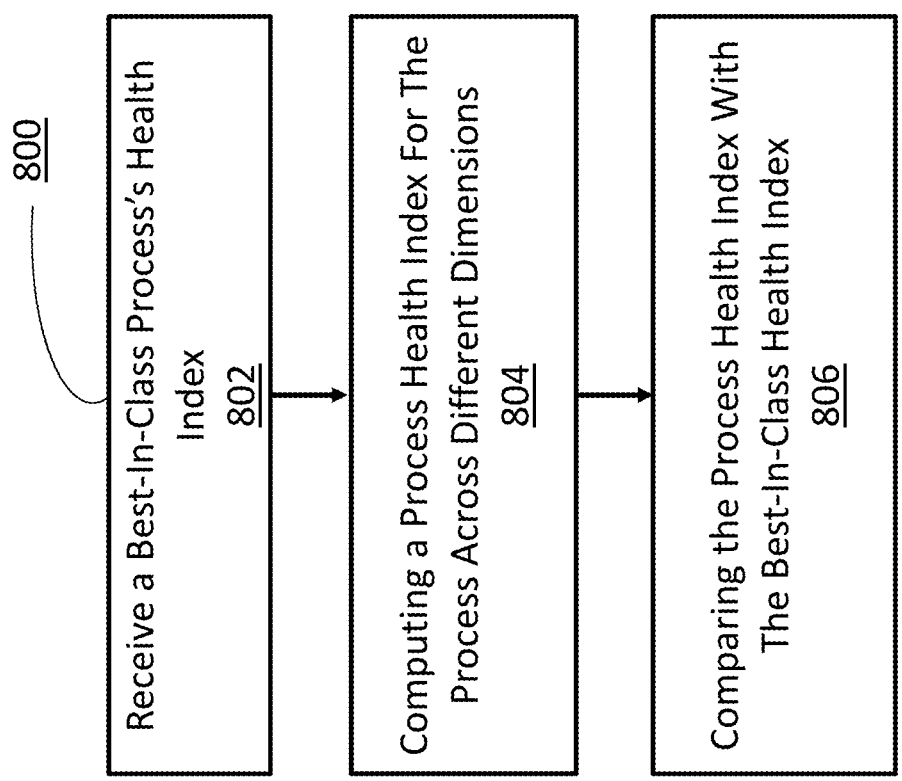
FIG. 8 illustrates an example process for assessing the health of a process against the health of a best-in-class process in an embodiment of the present disclosure.

FIG. 8 illustrates an example process for assessing the health of a process against the health of a best-in-class process in an embodiment. For purposes of illustrating clear examples, the process flow depicted in FIG. 8 will be discussed in connection with the process health assessment module 106 of FIGS. 1 and 2. However, a same or substantially similar process can be used for other implementations.

At block 802, the configuration module 206 receives a health level for a best-in-class process as a part of configuration data. Best-in-class process/best practices have been defined above. In an embodiment, the health level of the best-in-class process is used to benchmark the client's process against the best-in-class process. In another embodiment, the health levels of other clients' similar processes are used to benchmark the current client's process health level. In one embodiment, the health level for best-in-class process may be the highest or ideal maturity level of the BPM model in use by the client. In one embodiment, the client uses the Genpact BPM Model, and the health level for best-in-class process is four.

At block 804, the client's process health level is determined based on the process health index, as described above. At block 806, the client's process health index and process health level is compared to the health level for best-in-class process by the computational module 208. In one embodiment, the comparison of the client's process health level and the health level for best-in-class process is expressed as a difference between the two. In another embodiment, the difference between the two health levels may be represented as a percentage gap. For example, if the best-in class index is 4 and the client's process health index is 3.0, then the percentage gap would be ¼×100%=25%. In an embodiment, the comparison between the client's process health level and the health level for best-in-class process informs the client's management how to best spend resources to bring the client's process to the level of the best-in-class process.

Statistical Representations of a Process Health Index

Figure 9A:
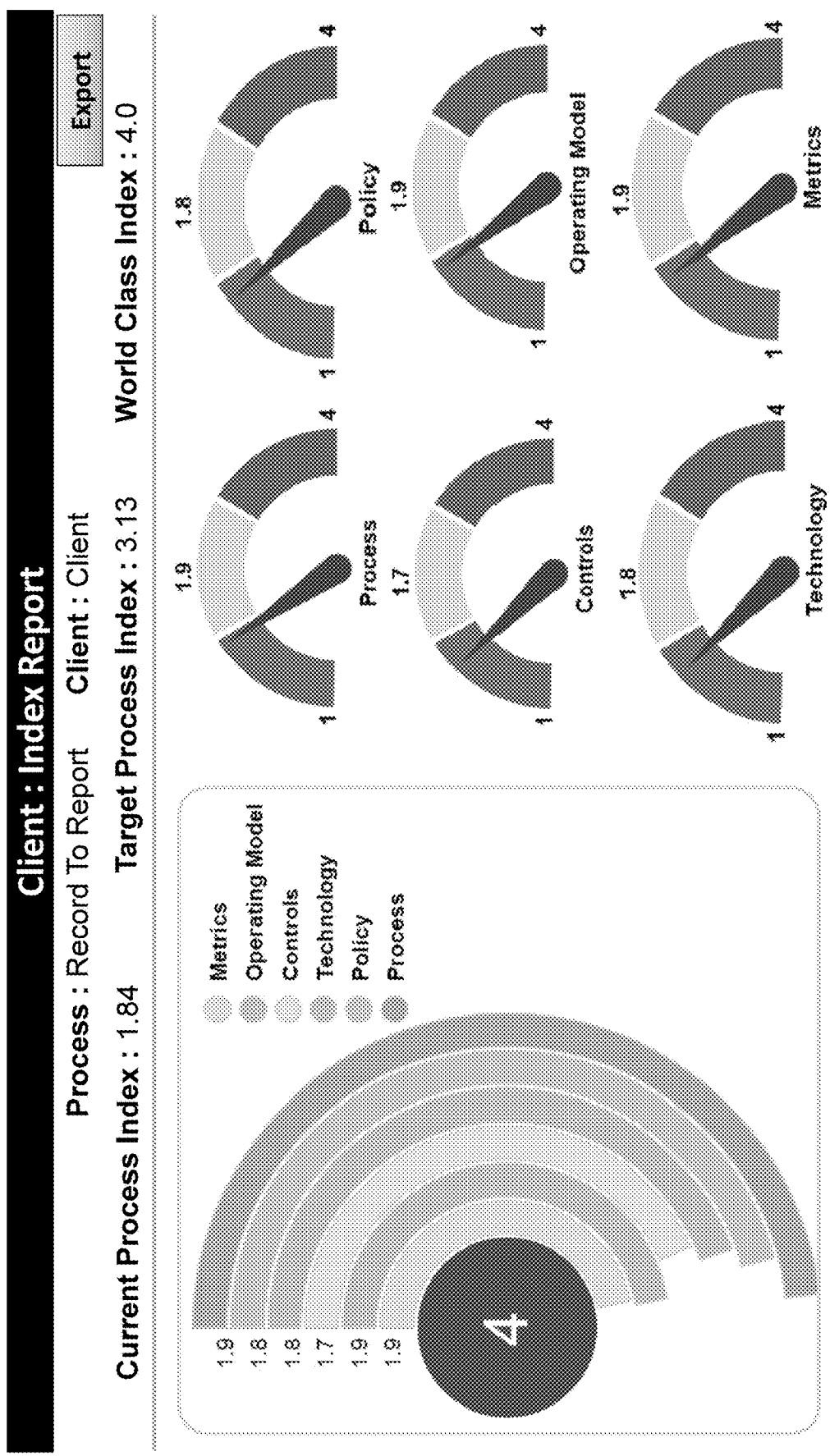
FIG. 9A illustrates an example graphical representation depicting a comparison between the health index of the process and the health index of the best-in-class process across the different dimensions in an embodiment of the present disclosure.

FIG. 9A illustrates an example graphical representation depicting a comparison between the health index of the process and the health index of the best-in-class process in an embodiment of the present disclosure. For purposes of illustrating clear examples, the process flow depicted in FIG. 9A will be discussed in connection with the process health assessment module 106 of FIGS. 1 and 2. However, a same or substantially similar process can be used for other implementations.

In one example, the result of the comparison between the client's process and the best-in-class process is outputted by the output module 212. The output of the comparison may be represented as a histogram, where each set of two bars represents the sub-process health index for each sub-process of the client's process and the best-in-class process, the x-axis is the sub-processes, and the y-axis is the sub-process index values. In other embodiments, the result of the comparison may be represented as a bar-diagram, pie-chart, or other suitable graphical representation. In an embodiment, the statistical representation of the best-in-class process's health level is distinct from the statistical representation of the client's process's health level. In an embodiment, the storage module 210 stores the results of the comparison. In one embodiment, the comparison between the client's process and the best-in-class process may be represented by a concentric circle chart, accompanied with a color-coded health reader for each dimension.

Figure 9B:
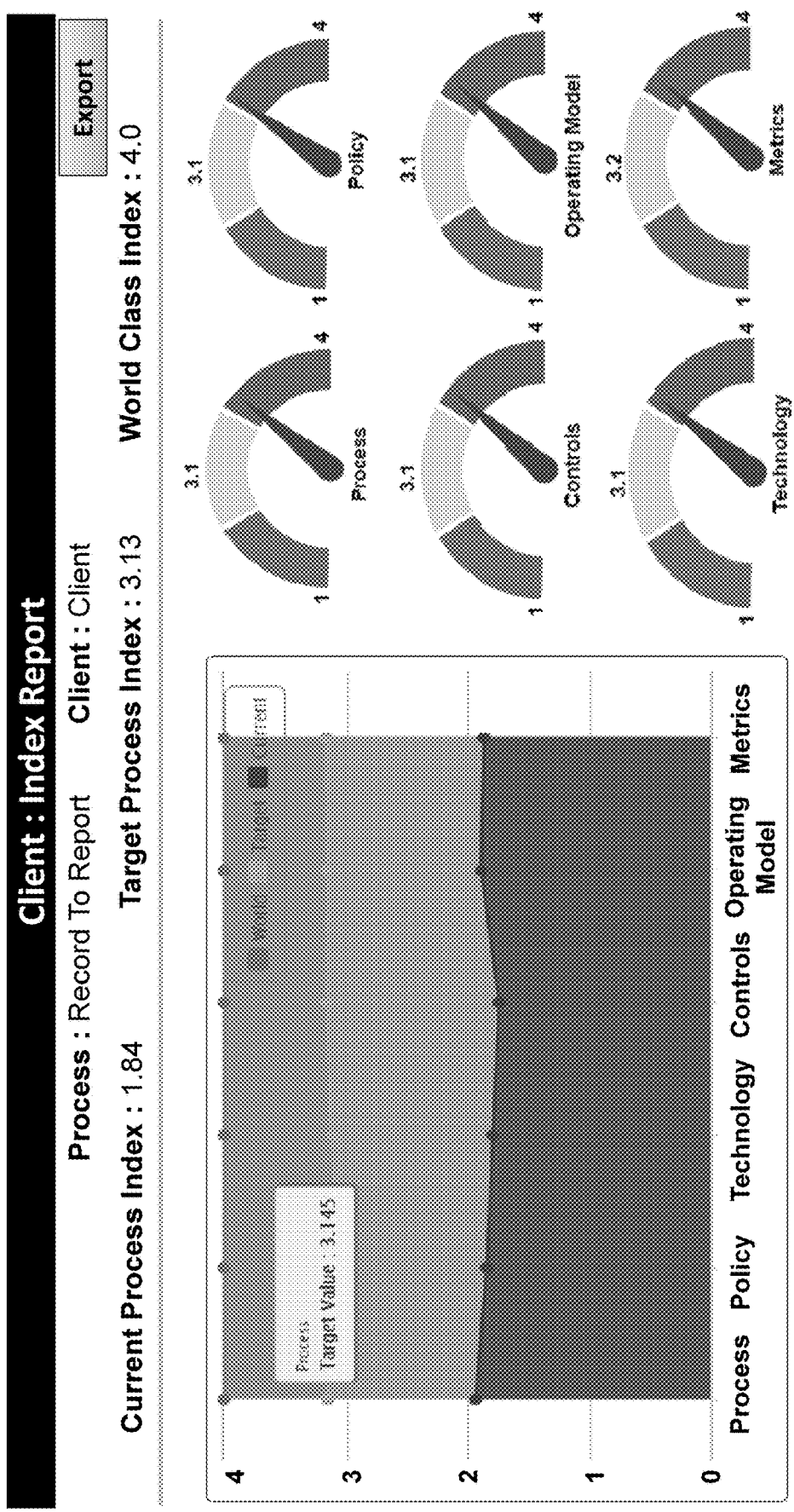
FIG. 9B illustrates an example graphical representation depicting a comparison between the health index of the process and the target across the different dimensions in an embodiment of the present disclosure.

FIG. 9B illustrates an example graphical representation depicting a comparison between the health index of the process and the target in an embodiment of the present disclosure. For purposes of illustrating clear examples, the process flow depicted in FIG. 9B will be discussed in connection with the process health assessment module 106 of FIGS. 1 and 2. However, a same or substantially similar process can be used for other implementations.

The result of the comparison between the health level of the client's process and the target health level may be outputted by the output module 212. In one embodiment, the output module 212 outputs the results of the comparison in the form of an Area graph that shows the gap or percentage gap between the best-in-class stage and the target health level for each sub-process from the current health level of each sub-process across all the dimensions. In other embodiments, the result of the comparison may be represented as a bar-diagram, pie-chart, gap graphs, or any other suitable graphical/statistical representations. In one embodiment, the statistical representation of the target health level is distinct from the statistical representation of the client's process's health level. The results of the comparison may be stored by the storage module 210.

Hardware Overview

According to one embodiment of the present disclosure, the techniques described herein may be implemented by one or more special-purpose computing devices. The special-purpose computing devices may be hard-wired to perform the techniques, or may include digital electronic devices, such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

Figure 10:
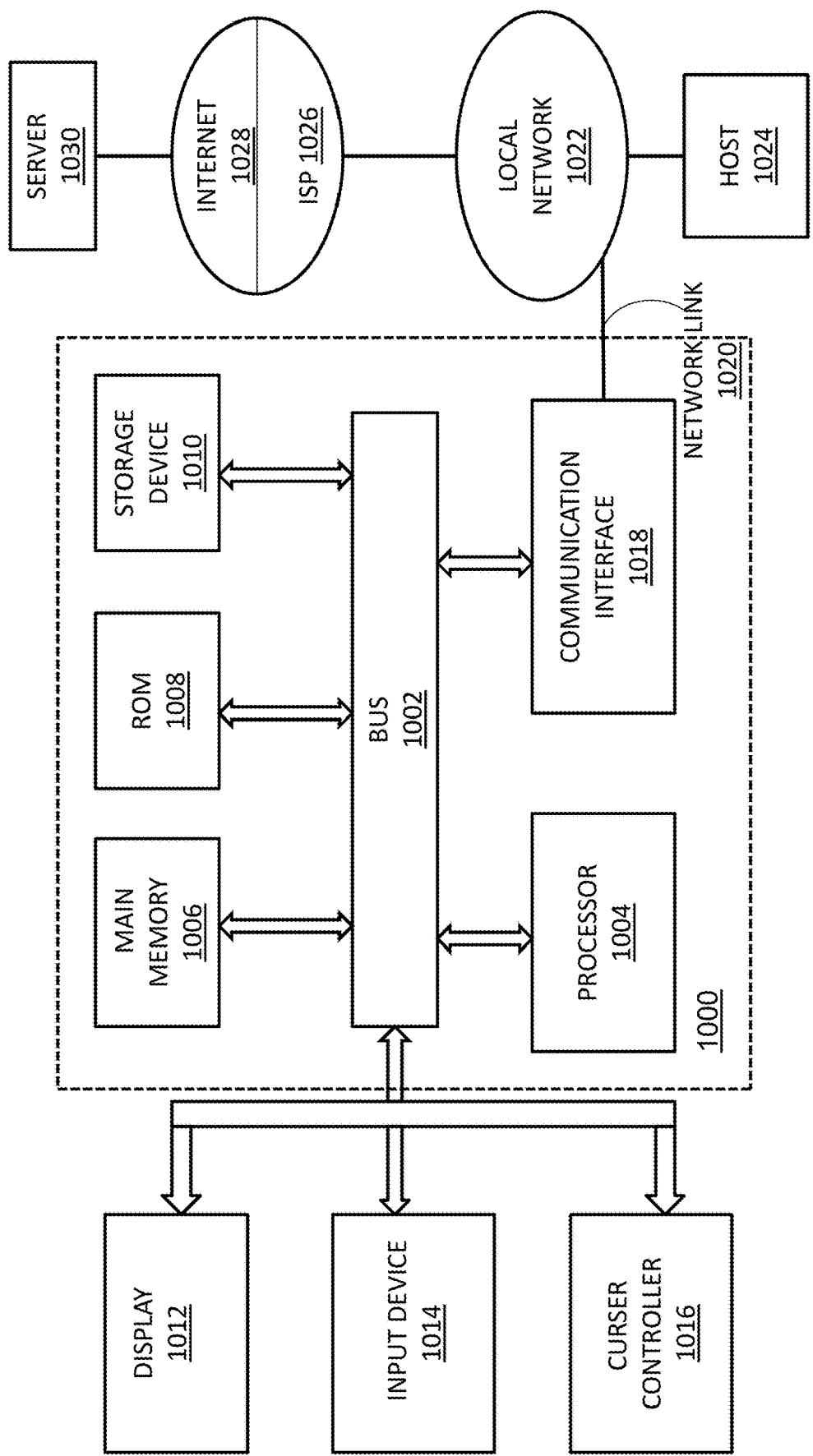
FIG. 10 illustrates in block diagram form an example computing system upon which an embodiment of the present disclosure may be implemented.

For example, FIG. 10 illustrates in block diagram form a computer system 1000 upon which an embodiment of the present disclosure may be implemented. The computer system 1000 may include a bus 1002 or other communication mechanism for communicating information, and a hardware processor 1004 coupled with bus the 1002 for processing information. The hardware processor 1004 may be, for example, a general purpose microprocessor.

The computer system 1000 may also include a main memory 1006, such as a random access memory (RAM), or other dynamic storage device, coupled to the bus 1002 for storing information and instructions to be executed by the processor 1004. The main memory 1006 also may be used for storing temporary variables or other intermediate information during execution of the instructions to be executed by the processor 1004. Such instructions, when stored in non-transitory storage media accessible to the processor 1004, render the computer system 1000 into a special-purpose machine that is customized to perform the operations specified in the instructions.

The computer system 1000 further includes a read only memory (ROM) 1008 or other static storage device coupled to the bus 1002 for storing static information and instructions for the processor 1004. A storage device 1010, such as a magnetic disk, optical disk, or solid-state drive is provided and coupled to the bus 1002 for storing information and instructions.

The computer system 1000 may be coupled via the bus 1002 to a display 1012, such as a cathode ray tube (CRT), for displaying information to a computer user. An input device 1014, including alphanumeric and other keys, may be coupled to the bus 1002 for communicating information and command selections to the processor 1004. Another type of user input device may be a cursor control 1016, such as a mouse, a trackball, or cursor direction keys, for communicating direction information and command selections to the processor 1004, and for controlling cursor movement on the display 1012. This input device typically has two degrees of freedom in two axes, a first axis (e.g., x) and a second axis (e.g., y), that allow the device to specify positions in a plane.

The computer system 1000 may implement the techniques described herein using customized hard-wired logic, one or more ASICs or FPGAs, firmware and/or program logic which in combination with the computer system 1000 causes or programs the computer system 1000 to be a special-purpose machine. According to one embodiment, the techniques herein are performed by the computer system 1000 in response to the processor 1004 executing one or more sequences of one or more instructions contained in the main memory 1006. Such instructions may be read into the main memory 1006 from another storage medium, such as the storage device 1010. Execution of the sequences of instructions contained in the main memory 1006 causes the processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media may include, for example, optical disks, magnetic disks, or solid-state drives, such as the storage device 1010. Volatile media may include dynamic memory, such as the main memory 1006. Common forms of storage media include, for example, a floppy disk, a flexible disk, a hard disk, a solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, or any other memory chip or cartridge.

Storage media is distinct from, but may be used in conjunction with, transmission media. Transmission media participates in transferring information between storage media. For example, transmission media may include coaxial cables, copper wire and fiber optics, including the wires that comprise the bus 1002. Transmission media can also take the form of acoustic or light waves, such as those generated during radio-wave and infra-red data communications.

Various forms of media may be involved in carrying one or more sequences of one or more instructions to the processor 1004 for execution. For example, the instructions may initially be carried on a magnetic disk or solid-state drive of a remote computer. The remote computer can load the instructions into its dynamic memory and send the instructions over a telephone line using a modem. A modem local to the computer system 1000 can receive the data on the telephone line and use an infra-red transmitter to convert the data to an infra-red signal. An infra-red detector can receive the data carried in the infra-red signal and appropriate circuitry can place the data on the bus 1002. The bus 1002 may carry the data to the main memory 1006, from which the processor 1004 may retrieve and execute the instructions. The instructions received by the main memory 1006 may optionally be stored on the storage device 1010 either before or after execution by the processor 1004.

The computer system 1000 also may include a communication interface 1018 coupled to the bus 1002. The communication interface 1018 provides a two-way data communication coupling to a network link 1020 that is connected to a local network 1022. For example, the communication interface 1018 may be an integrated services digital network (ISDN) card, cable modem, satellite modem, or a modem to provide a data communication connection to a corresponding type of telephone line. As another example, the communication interface 1018 may be a local area network (LAN) card to provide a data communication connection to a compatible LAN. Wireless links may also be implemented. In any such implementation, the communication interface 1018 sends and receives electrical, electromagnetic or optical signals that carry digital data streams representing various types of information.

The network link 1020 typically provides data communication through one or more networks to other data devices. For example, the network link 1020 may provide a connection through the local network 1022 to a host computer 1024 or to data equipment operated by an Internet Service Provider (ISP) 1026. The ISP 1026 may in turn provide data communication services through the world wide packet data communication network now commonly referred to as the "Internet" 1028. The local network 1022 and the Internet 1028 both use electrical, electromagnetic or optical signals that carry digital data streams. The signals through the various networks and the signals on the network link 1020 and through the communication interface 1018, which carry the digital data to and from the computer system 1000, are example forms of transmission media.

The computer system 1000 can send messages and receive data, including program code, through the network (s), the network link 1020 and the communication interface 1018. In the Internet example, a server 1030 might transmit a requested code for an application program through the Internet 1028, the ISP 1026, the local network 1022 and the communication interface 1018. The received code may be executed by the processor 1004 as it is received, and/or stored in the storage device 1010, or other non-volatile storage for later execution.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A computer-implemented method executed by at least one computer processor for determining health of at least one internal process within an organization, the method comprising:

communicating, via a network, with an external storage unit connected to at least one client system, wherein the client system uploads data pertaining to the process, for:

receiving at least one set of sub-processes comprising at least one sub-process, from the external storage unit, wherein the at least one sub-process is assessable across a plurality of dimensions;

computing a process health index value using a sub-process health index value and a sub-process weight value, of at least one sub-process selected automatically from said at least one set of sub-processes, wherein the sub-process health index value is computed in response to the automatic selection of the at least one sub-process, using:
  a set of dynamically received responses to a set of unique evaluators associated with at least one dimension in the plurality of dimensions, wherein each response is a weighted option selected from a plurality of weighted options and the weight associated with each weighted option corresponds to a maturity level of the process, and
  a dimensional weight value in the set of dimensional weight values assigned to said at least one dimension;
comparing said process health index with a target health index and comparing said process health index with a best-in-class health index, wherein the target health index and the best-in-class health index are values computed for at least one of a best-in-class process and a process that the organization wants to achieve for said evaluated process;
storing said process health index value, said sub-process health index value, and result of the comparisons in the storage unit;
generating at least one of a graphical and statistical output based on said process health index value and the result of the comparison process to determine health of said internal process; and
determining areas to facilitate improvement in the health of the internal process based on said output.

2. The computer-implemented method of claim 1, further comprising: receiving configuration data specifying a second process health index for the best-in-class process; comparing the process health index of the process to the second process health index for the best-in-class process; obtaining a set of results based, at least in part, on the comparison; storing the set of results; and generating at least one statistical representation based on the set of results.

3. The computer-implemented method of claim 1, further comprising receiving configuration data specifying a set of option weight values, wherein each option weight value in the set of option weight values is assigned to each weighted option in the plurality of weighted options.

4. The computer-implemented method of claim 1, further comprising receiving configuration data specifying the dimensional weight values.

5. The computer-implemented method of claim 1, further comprising receiving configuration data specifying the sub-process weight value.

6. The computer-implemented method of claim 1, further comprising receiving configuration data specifying the set of unique evaluators.

7. A non-transitory computer-readable storage medium storing one or more sequences of instructions, that when executed by one or more processors, cause the one or more processors to determine health of at least one internal process within an organization to facilitate improvement in the health of at least one internal process by performing steps comprising:
  communicating, via a network, with an external storage unit connected to at least one client system, wherein the client system uploads data pertaining to the process, for:
  receiving at least one set of sub-processes comprising at least one sub-process, from the external storage unit, wherein said at least one sub-process is assessable across a plurality of dimensions;
  computing a process health index value using a sub-process health index value and a sub-process weight value, of at least one sub-process selected automatically from said at least one set of sub-processes, wherein the sub-process health index value is computed in response to the automatic selection of the at least one sub-process, using
    a set of dynamically received responses to a set of unique evaluators associated with the at least one dimension in the plurality of dimensions, and wherein each response is a weighted option selected from a plurality of weighted options and the weight associated with each weighted option corresponds to a maturity level of the process, and
    a dimensional weight value in the set of dimensional weight values assigned to said at least one dimension;
  comparing said process health index with a target health index and comparing said process health index with a best-in-class health index, wherein the target health index and the best-in-class health index are values computed for at least one of a best-in-class process and a process that the organization wants to achieve for said evaluated process;
  storing said process health index value, said sub-process health index value and the results of the comparison process in the storage unit;
  generating at least one of a graphical and statistical output based on said process health index value and the results of the comparison process to determine health of said internal process; and
  determining areas to facilitate improvement in the health of the internal process based on said output.

8. The non-transitory computer-readable storage medium of claim 7, further comprising: receiving configuration data specifying a second process health index for a best-in-class process; comparing the process health index of the process to the second process health index of the best-in-class health index; obtaining a set of results based on the comparison; and generating statistical representations based on the set of results.

9. The non-transitory computer-readable storage medium of claim 7, further comprising receiving configuration data specifying a set of option weight values, wherein each option weight value in the set of option weight values is assigned to each weighted option in the plurality of weighted options.

10. The non-transitory computer-readable storage medium of claim 7, further comprising receiving configuration data specifying the dimensional weight values.

11. The non-transitory computer-readable storage medium of claim 7, further comprising receiving configuration data specifying the sub-process weight values.

12. The non-transitory computer-readable storage medium of claim 7, further comprising receiving configuration data specifying the set of unique evaluators.

13. An apparatus for determining health of at least internal process within an organization to facilitate improvement in the health of at least one internal process, the apparatus comprising:
  a memory device;
  a processor communicatively coupled to the memory device and executing instructions to determine the health of a process across a plurality of dimensions by:

communicating, via a network, with an external storage unit connected to at least one client system, wherein the client system uploads data pertaining to the process, for:

receiving at least one set of sub-processes comprising at least one sub-process, from the external storage unit, wherein said at least one sub-process is assessable across a plurality of dimensions;

computing a process health index value using a sub-process health index value and a sub-process weight value, of at least one sub-process selected automatically from said at least one set of sub-processes, wherein the sub-process health index is computed in response to the automatic selection of the at least one sub-process, using:
- a set of dynamically received responses to a corresponding set of unique evaluators associated with at least one dimension in the plurality of dimensions, wherein each response is a weighted option selected from a plurality of weighted options and the weight associated with each weighted option corresponds to a maturity level of the process, and
- a dimensional weight value in the set of dimensional weight values assigned to said at least one dimension;

comparing said process health index with a target health index and comparing said process health index with a best-in-class health index, wherein the target health index and the best-in-class health index are values computed for at least one of a best-in-class process and a process that the organization wants to achieve for said evaluated process;

storing said process health index value, said sub-process health index value, and results of the comparisons;

generating at least one of a graphical and statistical output based on at least said process health index value and the results of the comparison process to determine health of the internal process; and determining areas to facilitate improvement in the health of the internal process based on said output.

14. The apparatus of claim 13, further comprising: receiving a configuration data specifying a second process health index for a best-in-class process;

comparing the process health index of the process to the second process health index of the best-in-class process and generate a set of results based on the comparison;

storing the set of results;

and generating statistical representations based on the set of results.

15. The apparatus of claim 13, further comprising receiving configuration data specifying the dimensional weight values.

16. The apparatus of claim 13, further comprising receiving configuration data specifying the sub-process weight values.

17. The apparatus of claim 13, further comprising receiving configuration data specifying the set of unique evaluators.

* * * * *